March 8, 1966  J. L. ANDERSON  3,239,683
CRYOGENIC CIRCUIT
Original Filed Feb. 3, 1958  2 Sheets-Sheet 1
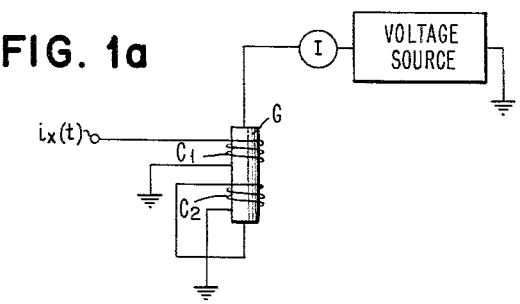
FIG. 1a
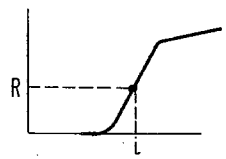
FIG. 1b
FIG. 2
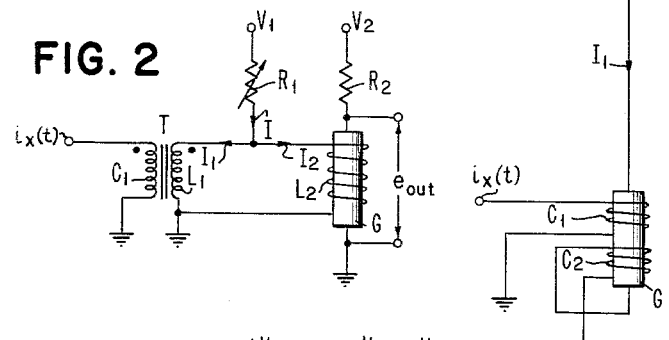
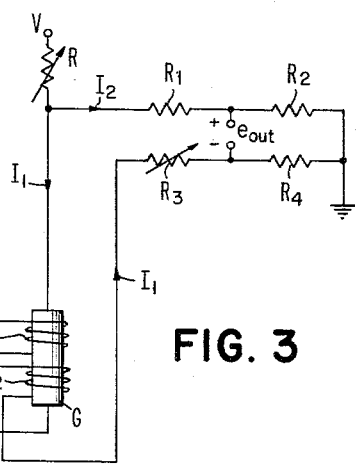
FIG. 3
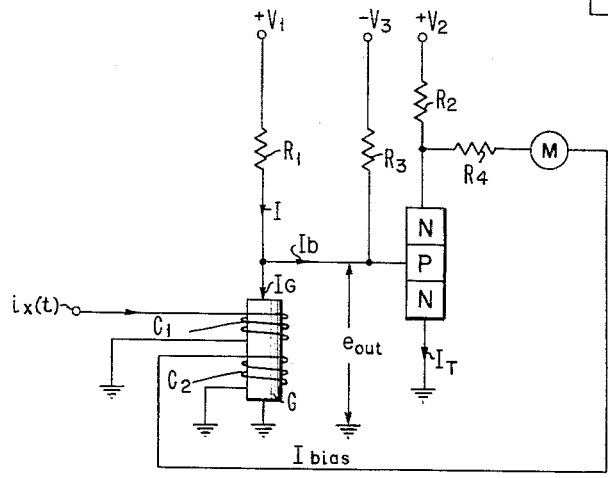
FIG. 4
INVENTOR
JOHN L. ANDERSON United States Patent Office 3,239,683
Patented Mar. 8, 1966

3,239,683
CRYOGENIC CIRCUIT
John L. Anderson, Poughkeepsie, N.Y., assignor to International Business Machines Corporation, New York, N.Y., a corporation of New York
Original application Feb. 3, 1958, Ser. No. 713,009, now Patent No. 3,050,683, dated Aug. 21, 1962. Divided and this application Sept. 19, 1961, Ser. No. 139,242
10 Claims. (Cl. 307—88.5)

The present invention, generally, relates to cryogenic circuitry and more particularly to a new and improved read-out cryogenic circuit. This application is a division of copending application Serial No. 713,009, now Patent No. 3,050,683, filed February 3, 1958.

It is an object of this invention to provide a new and improved cryogenic circuit for reading out information from a superconducting circuit.

Another object of the invention is to provide cryogenic circuits for measuring electric current flow in a superconducting circuit.

Still another object of the invention is to provide a new and improved circuit arrangement for reading out information without the introduction of electrical resistance.

A further object of the invention is to provide a cryogenic circuit for measuring electric current flow from one or more current sources.

A still further object of the invention is to provide a new and improved operative combination of a measuring circuit and a circuit for selecting one or more electric currents to be measured.

It is also an object of the invention to provide a new and improved commutator circuit.

Another object of the invention is to provide a commutator circuit uniquely adapted for use with a cryogenic electric current measuring circuit.

Still another object of the invention is to provide a new and improved commutator circuit arrangement wherein each of a plurality of currents to be measured is provided with a current path of zero resistance.

The above and other objects and advantages are accomplished by a unique circuit arrangement whereby an electric current is caused to flow in a winding positioned to control the resistance of a magnetic field-sensitive circuit component. The intensity of this magnetic field is adjusted to a predetermined value such that the electrical resistance of the field-sensitive component is at some value between two extremes. Then, by magnetically coupling a current the value of which is to be measured to the current mentioned above, its influence can be measured without reflecting resistance into the circuit of the measured current.

Such a circuit arrangement has several significant uses, some of which are illustrated in the drawings. One of the more important uses is in the field of superconductivity although the invention is not limited to that use.

All of the above and other objects are accomplished according to the invention by means of such circuit structure and relative arrangement of component parts thereof as will be more fully understood from a perusal of the description below which sets forth various specific features of an illustrative embodiment thereof.

In the drawings:

FIGURE 1a shows diagrammatically a circuit arrangement embodying the principles of the invention;

FIGURE 1b is a chart illustrating the relationship between the gate resistance and the gate current;

FIGURE 2 shows diagrammatically another circuit arrangement embodying the principles of the invention;

FIGURE 3 shows diagrammatically one circuit arrangement for utilizing the principles of the circuit shown in FIGURE 1a;

FIGURE 4 shows diagrammatically a further circuit arrangement embodying the principles of the invention.

Figure 5:
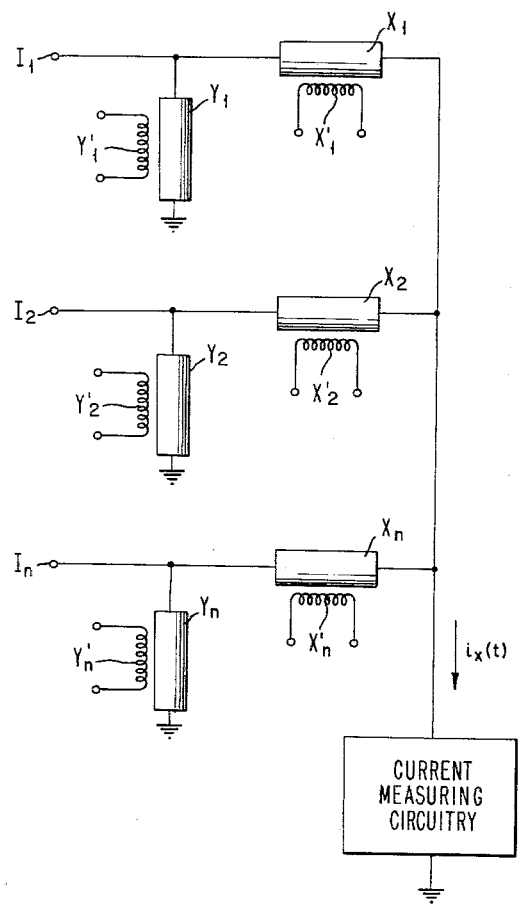
FIGURE 5 shows diagrammatically a commutator circuit for providing a current to be measured from selected sources.

Referring now to a circuit illustrating the principles of the invention, in FIGURE 1a the letter G represents a superconductive gate element, known as a cryotron. Connected in series with the cryotron gate G is an adjustable voltage source and an ammeter I. Also connected in series with the cryotron gate G is a winding $C_2$ which is positioned in magnetic field applying relation with the cryotron gate itself, so that the current flowing through the gate develops a magnetic field which, in turn, influences the resistance of the gate. A current $i_x(t)$, the value of which is to be measured, is coupled to the gate G by means of a winding $C_1$. With this arrangement, the magnetic field developed by the current to be measured influences the flow of current in the separate circuit which includes the gate G.

The coils $C_1$ and $C_2$ have a known magnetic effect on the gate G, which effect may be predetermined, for example, by controlling the number of turns in each winding and/or the spacing between each of the turns. In this manner the portion of the total magnetic effect contributed by each coil is predetermined. For the purposes of the following detailed description of the operation of the circuit shown in FIGURE 1a, it will be assumed that the coil $C_1$ has the same magnetic effect on the gate G as the coil $C_2$.

Initially, the magnitude of the voltage source is adjusted until the gate G is balanced somewhere on its transition characteristic between zero resistance and its normal resistance, as indicated in FIGURE 1b. Then, an input current $i_x(t)$ will either raise or lower the resistance of the gate G depending upon the manner in which the winding $C_1$ is positioned in relation with the gate $G_1$. If the resistance of the gate G is lowered, then the gate will draw more current from the voltage source until the effect of $i_x(t)$ is cancelled such that the change in current read on the meter I is a function of the $i_x(t)$ current.

Contrary to the above, if the current $i_x(t)$ causes the resistance of the gate G to increase, then the gate G draws less current from the voltage source and the change in the current through the gate is read again by the meter I as a function of $i_x(t)$, similarly as above. Since the purpose of this circuit is to measure the value of the current $i_x(t)$ without reflecting or introducing any resistance into the coil $C_1$, the coil $C_1$ will be superconducting as part of the circuit in which the current $i_x(t)$ is flowing. However, it should be noted that it will not be necessary for the coil $C_2$ to be superconducting since its resistance will in no way be reflected into the circuit of the coil $C_1$. Also the gate G may be any magnetic field-sensitive resistor as, for example, a bismuth wire.

By a slight modification in the above arrangement, the circuit shown in FIGURE 2 is formed which operates on the same principles as those just described. In FIGURE 2 a separate series branch includes a source of voltage $V_2$, a resistor $R_2$ and a gate G. A current I from a source $V_1$ having a resistance $R_1$ divides between the coils or windings $L_1$ and $L_2$ (assume in this instance that $L_1=L_2$). The current $I_2$ which flows in the winding $L_2$ drives the gate G to some point on its resistance transition curve between zero resistance and its normal resistance. The resistance of the gate G due to the current $I_2$ and the current flowing because of the voltage $V_2$ determines the value of the output voltage $e_{out}$.

A transformer T couples the current $i_x(t)$ into the circuit loop formed by the coils or windings $L_1$ and $L_2$. The dots shown in FIGURE 2 on the primary winding $C_1$ of the transformer T and also on the secondary winding $L_1$ indicate that these ends of the transformer windings are positive at the same time and negative at the same time. Thus a current $i_x(t)$ flowing into the dotted end of the primary winding $C_1$ causes a current to flow out of the dotted end of the secondary winding $L_1$ which secondary current opposes the current $I_1$ and, in turn, causes an increase in the current $I_2$.

When the current $I_2$ increases, the magnetic effect of the winding $L_2$ increases the gate resistance, resulting in an increased voltage $e_{out}$. Conversely, a decrease in the current to be measured $i_x(t)$ will cause a decrease of the current $I_2$ and, hence, a decrease of the voltage $e_{out}$. Again, so that no resistance is either introduced or reflected into the circuit of the current $i_x(t)$, all of the windings are superconducting so that no resistive component of impedance is developed. However, it may be seen that the gate G can be any magnetic field-sensitive resistance such as, for example, a bismuth wire.

This circuit shown in FIGURE 2 will give a wider range of a measurable voltage $e_{out}$ than is obtainable with the current measurements in the circuit shown in FIGURE 1a. This is because the current supplied to the gate G, in FIGURE 2, by source $V_2$ through resistance $R_2$ will produce no voltage $e_{out}$ when the gate G is superconducting, and will produce the maximum readable voltage $e_{out}$ when the gate is switched to its normal resistance due to a full magnetic effect of the coil $L_2$. Thus, over the range from zero resistance to the normal resistance of the gate, a complete range of voltage $e_{out}$ may be obtained. For this arrangement, the coil $C_1$ must be superconducting as in the above-described circuit arrangements.

It should be noted further that, though the current $i_x(t)$ is transformer coupled to the measuring circuit (FIGURE 2), a continuous output indicative of the value of $i_x(t)$ is obtained even when this current is at a steady value. Stated another way, it may be said that D.C. transformer action is obtained, and the circuit is responsive to produce outputs indicative of any variation in the current $i_x(t)$ from zero frequency to the upper limiting frequency of the transformer T. This type of operation results because the secondary coil $L_1$ of the transformer T is connected with coil $L_2$ in a closed, completely superconductive loop. The net flux threading this loop may not be changed as long as it remains entirely superconductive and, therefore, currents are produced in the loop which are dependent not upon the rate of change of current $i_x(t)$ in the primary coil but upon the value of this current. Further, this current in the loop continues to flow once the current $i_x(t)$ is established in coil $C_1$ and varies in magnitude as the current $i_x(t)$ varies so that there is always a loop current, the value of which is a measure of the value of the current $i_x(t)$.

In FIGURE 3 of the drawings it is shown how the principle of the invention as described in connection with FIGURE 1a may be employed with an indicating circuit similar to a conventional Wheatstone bridge. In this indicating circuit the voltage $e_{out}$ will be equal to $I_2R_2-I_1R_4$. If the resistor $R_3$ is made variable, then the circuit can be balanced so that $I_1$ equals $I_2$. If the value of the resistance $R_2$ is selected to be equal to the resistance $R_4$, and the current $I_1$ is adjusted to be equal to the current $I_2$, then the voltage $e_{out}$ will be equal to zero.

Assume, now, the voltage V, in FIGURE 3, develops a current which is divided into parallel path currents $I_1$ and $I_2$. The current $I_1$ is adjusted by the variable resistor $R_3$ such that the magnetic effect of the winding $C_2$ positioned in inductive relation with gate G causes the resistance of the gate to be at some value between zero and its normal resistance. Now if a current to be measured $i_x(t)$ is applied to the coil $C_1$ and it is assumed that the coils $C_1$ and $C_2$ produce equal magnetic effects, then the gate G becomes more resistive, thereby reducing the current $I_1$. When the current $I_1$ reduces, the current $I_2$ increases and the voltage output $e_{out}$ increases, and the magnitude of the increase in $e_{out}$ may be related to the magnitude of the current $i_x(t)$ to be measured.

Although the voltage $e_{out}$ is not linearly related to the current $i_x(t)$, a calibration curve can be drawn so that variations in the voltage $e_{out}$ can be converted easily to present the magnitude of the current $i_x(t)$.

If the variable resistor $R_3$ is calibrated in current, the current $i_x(t)$ to be measured can be read directly from the resistor $R_3$ if $e_{out}$ is rebalanced to zero after the magnetic effect of the winding $C_1$ is established. This method of reading the value of the current $i_x(t)$ is similar to the above method in that the circuit is initially balanced with the current $I_1$ and the magnetic effect of the coil $C_2$ on the gate G so that the voltage $e_{out}$ is zero. Then by applying the current $i_x(t)$ to be measured to the coil $C_1$ as before, the current $I_1$ decreases and the current $I_2$ increases. Now if the value of the resistor $R_3$ is decreased to restore the balance between the currents $I_1$ and $I_2$, the voltage $e_{out}$ is returned to zero and the value of the current $i_x(t)$ to be measured is obtained directly from the calibrated resistor $R_3$.

As before, if the current $i_x(t)$ to be measured is negative, then the gate G becomes less resistive and the current $I_1$ becomes greater than the current $I_2$ giving a negative voltage $e_{out}$ related to the current $i_x(t)$ by the calibration curve. However, whether the current $i_x(t)$ is positive or negative, it will be measurable by this circuit arrangement. It may be seen that the coil $C_2$ and the gate G need not necessarily be superconducting materials. However, the coil $C_1$ must be superconducting.

The circuit arrangement shown in FIGURE 4 shows a further use to which the principles of the invention are applicable. The voltage change which is developed across the gate G in order to restore the balance at a point between zero and its normal resistance is indicative of the magnitude of the current to be measured. As described in connection with FIGURE 2, the current I supplied by the source represented by voltage $V_1$ and resistance $R_1$ divides between the parallel path currents $I_g$ and $I_b$, FIGURE 4, the current $I_g$ flowing through the gate G.

The magnetic effect of a winding $C_2$ positioned in magnetic field applying relation with the gate G is determined by the magnitude of the current $I_{bias}$, which current, in turn, is controlled by a NPN transistor. For example, when the NPN transistor is more conducting, then more current $I_T$ supplied by the voltage $V_2$ having a resistance $R_2$ flows through the transistor, thus decreasing the current $I_{bias}$ and decreasing a magnetic effect of the coil $C_2$ which renders the gate G more conducting.

To control the conductance of the NPN transistor, a voltage $V_3$ having a resistance $R_3$ is connected to the P terminal of the transistor. The effect of the constant current supplied by the voltage $V_3$ on the terminal P is influenced by the magnitude of the current $I_b$ which, in turn, is influenced by the magnitude of the current $I_g$.

A meter M indicates the value of the current $I_{bias}$ required by the coil $C_2$ in order to hold the gate G at the balance point. To illustrate further, first assume a small increase in the resistance of the gate G. This causes the current $I_g$ to decrease and, accordingly, the current $I_b$ to increase permitting the NPN transistor to conduct an increased value of current $I_T$. However, as the current $I_T$ increases, the current $I_{bias}$ decreases and some of the increase in resistance of the gate G is counteracted.

On the other hand, if a small decrease in the resistance of the gate G occurs, then the current $I_g$ increases and the current $I_b$ decreases. The NPN transistor now conducts less current $I_T$ and, hence, more current $I_{bias}$ flows through the coil $C_2$. The increase in the magnetic effect of the coil $C_2$ restores some resistance to the gate G to restore the balance.

The current $i_x(t)$ to be measured is applied now to the coil $C_1$ (which is assumed to be equivalent in magnetic effect to the coil $C_2$). By interaction between the effects of the fields of the coils $C_1$ and $C_2$, the current $i_x(t)$ effectively introduces or removes resistance in the gate G. The resulting change in the current $I_{bias}$ required to achieve a new balance is related to the change in the current $i_x(t)$ to be measured. Hence, the meter M can be designated to read directly the true value of the current $i_x(t)$.

Of course it is known that the relationship between the resistance of a cryotron and the current flowing therethrough is not linear. However, by appropriate calculation this relationship can easily be determined.

As a portion of a selected read-out circuit, it is contemplated that provision may be made for applying a current to be measured $i_x(t)$ as the resultant current from one or more selected sources. FIGURE 5 illustrates one circuit arrangement for selecting the current $i_x(t)$ from one or more current sources $I_1, I_2 \ldots I_n$. Since it is essential that no resistance be introduced or reflected into these current sources, a current path of zero resistance to ground is always available to each current source $I_1, I_2 \ldots I_n$ either through the superconductive gate Y to ground or through the superconductive gate X and a superconductive measuring circuit to ground.

To illustrate this arrangement in greater detail, assume that it is desired to measure the magnitude of the current at the current source $I_1$ only, as shown in FIGURE 5. A pulse of electric current applied to the windings $X_2' \ldots X_n'$ will produce a magnetic field to drive the associated superconductive gates $X_2 \ldots X_n$ resistive. These current sources $I_2 \ldots I_n$ are shunted to ground through the respective superconductive gates $Y_2 \ldots Y_n$. The winding $X_1'$, on the other hand, is not energized. Instead, the winding $Y_1'$ receives the current pulse to drive the superconductive gate $Y_1$ resistive, thereby providing a path of zero resistance to ground for the current source $I_1$ through the superconductive gate $X_1$ and the superconductive measuring circuit. In like manner, each of the current sources $I_2 \ldots I_n$ may be applied to the measuring circuit without interaction or "cross-talk" between any two currents.

Of course it is to be understood that the measuring or read-out circuits described above may be used individually or in combination with other commutator circuits, the present commutator and read-out circuit combination being solely for illustration purposes.

It is to be understood that the above-described circuit arrangements are simply illustrative of the application of the principles of the invention. Numerous other arrangements may readily be devised by those skilled in the art which will embody the principles of the invention and fall within the spirit and scope thereof.

What is claimed is:

1. A read-out circuit comprising means sensitive to a magnetic field such that its electrical resistance is controllable by the intensity of the magnetic field, a closed superconducting loop including a winding of superconducting material positioned in magnetic field applying relation with said field-sensitive means, superconducting means for developing in said winding means while superconducting a direct current representative of the magnitude of an electrical current to be read, and means for indicating the magnetic effect of the magnetic field on the field-sensitive means.

2. A read-out circuit as set forth in claim 1 wherein said winding means is connected to receive another electric current to establish a predetermined effect on said field-sensitive means, and said indicating means is connected to indicate the change in the predetermined effect which is caused by the direct current.

3. A read-out circuit as set forth in claim 1 wherein said field-sensitive means comprises a superconductive material.

4. A read-out circuit as set forth in claim 1 wherein said developing means comprises a transformer of superconductive material.

5. A read-out circuit as set forth in claim 1 wherein said developing means is connected to produce the direct current in response to the output of a commutator circuit.

6. An electrical circuit including a first superconducting current path; a second current path formed entirely of superconductive material and defining a closed loop; said closed superconductive loop being magnetically coupled to said first current path; means for directing current along said first current path while maintaining said closed loop entirely superconducting to generate a current in said second path in accordance with the magnitude of current flow through said first path and means magnetically coupled to said closed superconducting loop for sensing said current thus generated.

7. An electrical circuit including an element formed of superconductive material, means for establishing said element at a point on its resistance transition characteristic intermediate a zero resistance and a normal resistance state, first inductive means arranged in field applying relationship with said element, said first inductive means being formed of superconductive material and defining a closed loop, means for varying the magnitude of current flow along said first inductive means whereby the effective resistance of said element is varied, and means for ascertaining variations in the resistance of said element.

8. An electrical circuit as defined in claim 7 wherein said establishing means comprises second means for applying a predetermined magnetic field to said element so as to establish said element at said point on the resistance transition characteristic.

9. An electrical circuit as defined in claim 7 wherein said establishing means includes means for directing a current of predetermined magnitude along said first inductive means.

10. An electrical circuit as defined in claim 7 further comprising inductive input means coupled to said closed loop thus defined, current flow induced along said first inductive means being proportional to the magnitude of current flow along said inductive input means.

References Cited by the Examiner

UNITED STATES PATENTS 2,913,881  11/1959  Garwin _____ 307—88.5 X
2,935,694   5/1960  Schmitt et al. _____ 307—88.5

ARTHUR GAUSS, *Primary Examiner.*

JOHN W. HUCKERT, GEORGE N. WESTBY,
*Examiners.*